US009146586B2

(12) United States Patent
Ho et al.

(10) Patent No.: US 9,146,586 B2
(45) Date of Patent: Sep. 29, 2015

(54) ELECTRONIC DEVICE (71) Applicant: ASUSTeK COMPUTER INC., Taipei (TW)

(72) Inventors: Ming-Yuan Ho, Taipei (TW); Yung-Nien Chen, Taipei (TW); Shih-Wen Chiang, Taipei (TW); Shih-Huang Wei, Taipei (TW); Juei-Yuan Wu, Taipei (TW); Yi-Ting Lin, Taipei (TW); Yuan-Min Tsao, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 131 days.

(21) Appl. No.: 14/105,191

(22) Filed: Dec. 13, 2013

(65) Prior Publication Data

US 2014/0177162 A1   Jun. 26, 2014

Related U.S. Application Data

(60) Provisional application No. 61/739,732, filed on Dec. 20, 2012.

(30) Foreign Application Priority Data

Nov. 15, 2013   (CN) .......................... 2013 1 0574758

(51) Int. Cl.
   *G06F 1/16*   (2006.01)
(52) U.S. Cl.
   CPC ............ *G06F 1/1616* (2013.01); *G06F 1/1632* (2013.01); *G06F 1/1654* (2013.01); *G06F 1/1681* (2013.01)

(58) Field of Classification Search
   USPC ................ 312/223.1, 223.6, 34.12, 247, 213, 312/223.3, 7.2, 244; 358/474; 345/168, 345/173, 175, 156, 1.1, 169, 211, 82, 184, 345/174, 77; 136/251; 455/41.1, 456.1, 455/566, 466; 360/78.04, 99.08, 261.3, 360/254.8, 99.15
   See application file for complete search history.

(56) References Cited

U.S. PATENT DOCUMENTS

2013/0279100 A1*  10/2013  Fontana et al. ............ 361/679.2
2014/0026946 A1*  1/2014   West et al. ................... 136/251
   (Continued)

FOREIGN PATENT DOCUMENTS

CN   2735718 Y   10/2005
TW   M427598     4/2012
   (Continued)

*Primary Examiner* — Hung Duong
(74) *Attorney, Agent, or Firm* — CKC & Partners Co., Ltd.

(57) ABSTRACT

An electronic device includes a tablet module and a docking base. The tablet module includes a slot, a sliding element and a plurality of first attracting elements. The sliding element is slidably disposed in the slot. The first attracting elements are adjacently disposed on the sliding element and have a first attracting side. The polarities of each two adjacent first attracting elements at the first attracting side are different. The docking base includes a bearing sheet and a plurality of second attracting elements. The bearing sheet is inserted to the slot and abuts against the sliding element. The second attracting elements are adjacently disposed on the hearing sheet and have a second attracting side. The polarities of each two adjacent second attracting elements at the second attracting side are different.

13 Claims, 9 Drawing Sheets

(56) References Cited

U.S. PATENT DOCUMENTS

2014/0098025 A1* 4/2014 Lin et al. .................. 345/169
2014/0146371 A1* 5/2014 Hayashi et al. ............ 358/474

FOREIGN PATENT DOCUMENTS

| TW | 201218607 | 5/2012 |
| TW | M428394 | 5/2012 |

* cited by examiner

FIG. 11B

ELECTRONIC DEVICE

CROSS-REFERENCE TO RELATED APPLICATION

This application claims the priority benefits of U.S. provisional application Ser. No. 61/739,732, filed on Dec. 20, 2012 and CN application serial No. 201310574758.1, filed on Nov. 15, 2013. The entirety of the above-mentioned patent applications are hereby incorporated by reference herein and made a part of specification.

BACKGROUND OF THE INVENTION

1. Field of the invention

The invention relates to an electronic, device and, more particularly, to an electronic device which includes a tablet module and a docking base.

2. Description of the Related Art

A computer is widely used in life and work. A desktop computer usually includes a screen, a host, a keyboard, a mouse, a printer and relating peripheral devices. Since the desktop computer includes many components, the installation of the desktop computer is complicated, in addition, the desktop computer only can be used in a fixed position. Thus, it is not portable. Consequently, a portable notebook computer becomes popular, and a tablet computer which is lighter, thinner and portable is much more convenient.

However, unlike the notebook computer, the tablet computer cannot take place of the desktop computer to become a main device for office and entertainment due to the inconvenient inputting way. Since the tablet computer does not include a physical keyboard, if a user needs to input words for a long time, the user would feel laborious. Thus, a product which includes a tablet module and a keyboard attached to each other and combines the advantages of the tablet computer and the notebook computer is launched. The keyboard can not only be used to input, but also extend endurance time. When the keyboard is not needed, it can be detached and the tablet module can be used individually.

However, when the user wants to combine the tablet module and the keyboard, a hook structure at the keyboard must be aligned to a slot at the bottom of the tablet module precisely, thus the tablet module can be inserted to the keyboard, which is annoying.

BRIEF SUMMARY OF THE INVENTION

An electronic device is provided. The electronic device includes a tablet module and a docking base. The tablet module includes a slot, a sliding element and a plurality of first attracting elements. The sliding element is slidably disposed in the slot. The first attracting elements are adjacently disposed on the sliding element and including a first attracting side. Polarities of each two adjacent first attracting; elements at the first attracting side are different. The docking base includes a bearing sheet and a plurality of second attracting elements. The bearing sheet is inserted to the slot and abuts against the sliding element. The second attracting elements are adjacently disposed on the bearing sheet and including a second attracting side. Polarities of each two adjacent second attracting elements at the second attracting side are different. The polarity of each of the first attracting elements at the first attracting side is different from the polarity of the corresponding second attracting element at the second attracting side, and the first attracting side is attracted with the second attracting side. The polarity of each of the first attracting elements at the first attracting side is the same and repulsive with the polarity of the second attracting elements which are beside the corresponding second attracting element at the second attracting side, the polarity of each of the second attracting elements at the second attracting side is the same and repulsive with the polarity of the first attracting elements which are beside the corresponding first attracting element at the first attracting side, and each of the first attracting elements is guided to align to the corresponding second attracting element.

These and other features, aspects and advantages of the present disclosure will become better understood with regard to the following description, appended claims, and accompanying drawings.

DETAILED DESCRIPTION N THE EMBODIMENTS

The disclosure is illustrated with multiple embodiments and details are also illustrated as follows. However, the details cannot limit the scope of the disclosure, which means the details are not necessary in a part of the embodiments. Moreover, some conventional components and elements are simplified in figures.

Figure 1:
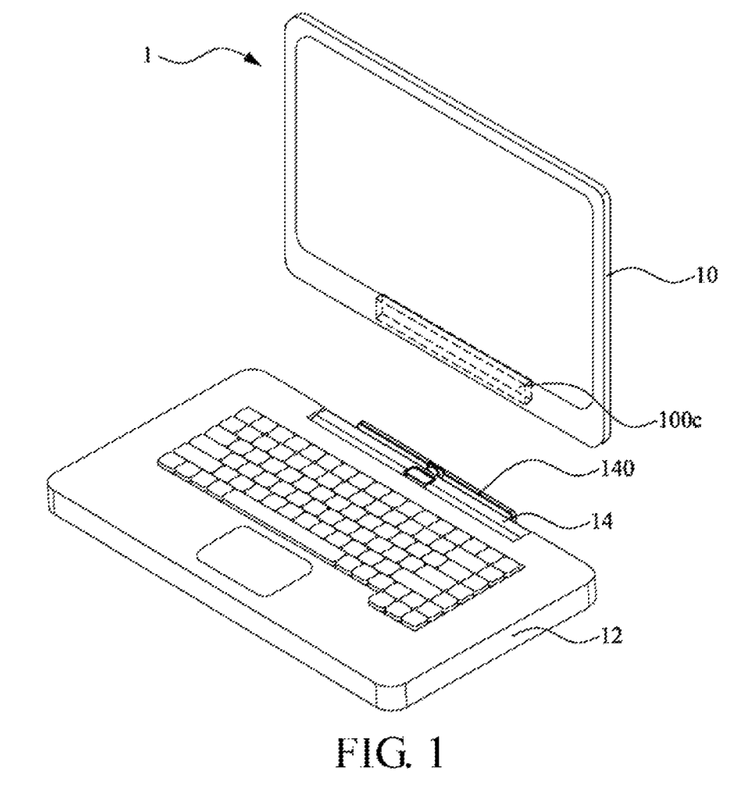
FIG. 1 is a schematic diagram showing an electronic device of which a tablet module is detached from a keyboard base in an embodiment.

FIG. 1 is a schematic diagram showing an electronic device 1 of which a tablet module 10 is detached from a keyboard base in an embodiment.

As shown in FIG. 1, in the embodiment, an electronic device 1 includes a tablet module 10, a keyboard base 12 and a docking base 14. A slot 100c is formed at the bottom of the tablet module 10 (as shown in a dotted line in FIG. 1). The docking base 14 is connected to the keyboard base 12 and includes a bearing sheet 140. The bearing sheet 140 of the docking base 14 is adapted to be inserted to the slot 100c of the tablet module 10 and combined with the tablet module 10. When the tablet module 10 is separated from the docking base 14, the user uses a touch control input function of the tablet module 10 to operate the tablet module 10. When the tablet module 10 is combined with the docking base 14, the docking base 14 is regarded as an electrical connecting bridge between the tablet module 10 and the keyboard base 12, and the user can operate the keyboard base 12 to input control commands to the tablet module 10. The structure and functions of the components in the tablet module 10 and the docking base 14 and the connection between the components are illustrated as follows.

Figure 2A:
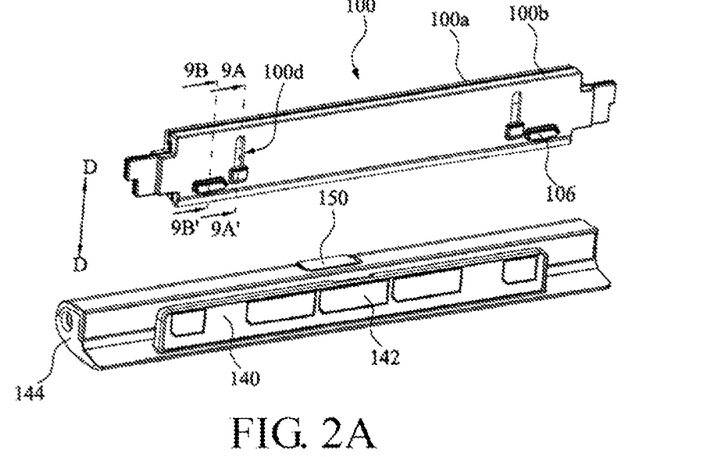
FIG. 2A is a schematic diagram showing that an accommodating seat of the tablet module and a docking base in FIG. 1 are separated.
Figure 2B:
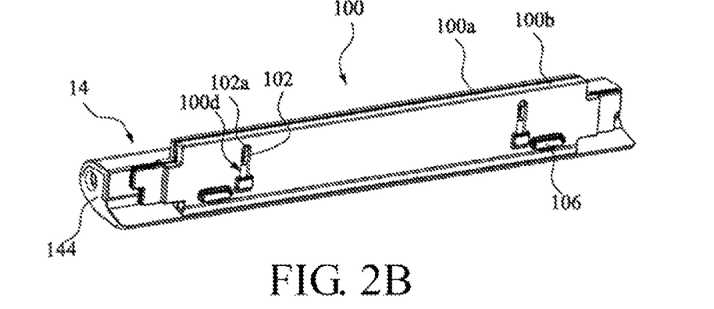
FIG. 2B is a schematic diagram showing an assembly of the accommodating seat and the docking base in FIG. 2A.
Figure 3:
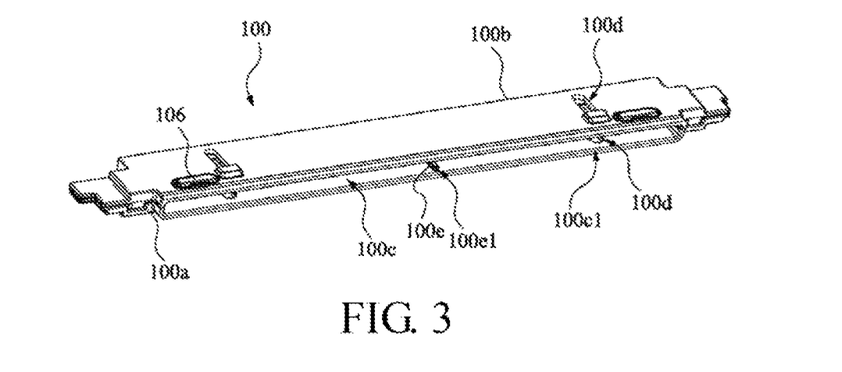
FIG. 3 is a schematic diagram showing an assembly of a first casing and a second casing, of the accommodating seat in FIG. 2A.

Please refer to FIG. 2A, FIG. 2B and FIG. 3. FIG. 2A is a schematic diagram showing that an accommodating seat 100 of the tablet module 10 and the docking base 14 in FIG. 1 are separated. FIG. 2B is a schematic diagram showing an assembly of the accommodating seat 100 and the docking base in FIG. 2A. FIG. 3 is a schematic diagram showing an assembly of a first casing 100a and a second casing 100b of the accommodating seat 100 in FIG. 2A.

As shown in FIG. 2A to FIG. 3, in the embodiment, the tablet module 10 includes an accommodating seat 100. The accommodating seat 100 is disposed at the bottom of the tablet module 10 and includes a first casing 100a and a second casing 100b. The first casing 100a is combined with the second casing 100b to form an opening 100c1 and the slot 100c. The slot 100c of the accommodating seat 100 has a plugging direction D, and thus the bearing sheet 140 of the docking base 14 can be inserted to the slot 100c through the opening 100c1 along the plugging direction D.

Figure 4:
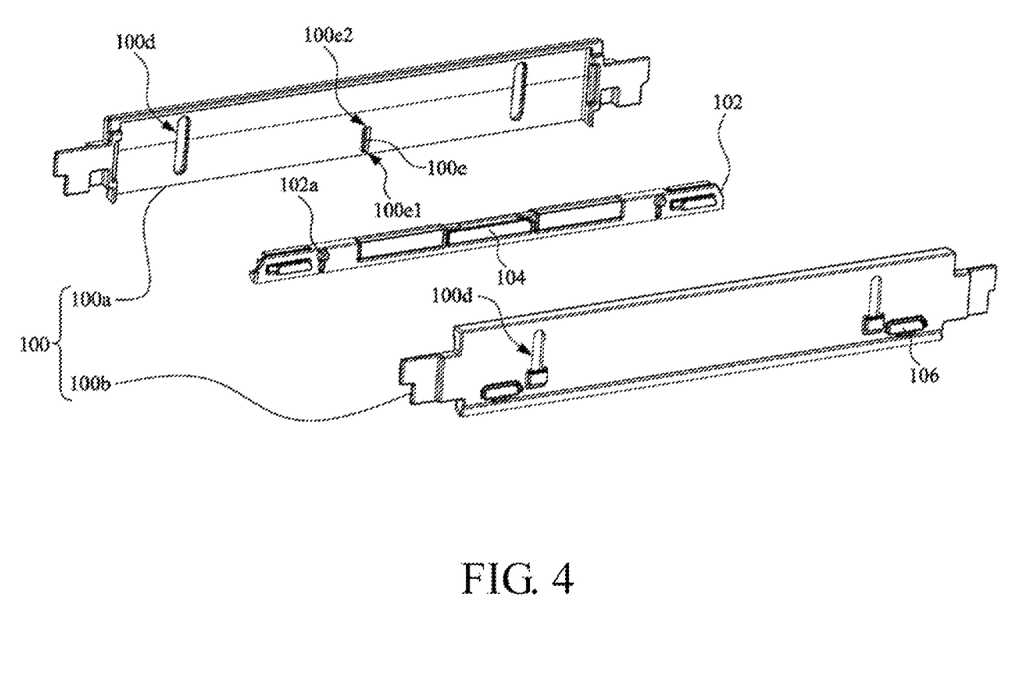
FIG. 4 is an exploded diagram showing the accommodating seat in FIG. 2A and components in a slot.

FIG. 4 is an exploded diagram showing the accommodating seat 100 in FIG. 2A and components in the slot 100c.

Please refer to FIG. 4 and FIG. 2A to FIG. 3, in the embodiment, the tablet module 10 further includes a sliding element 102 and a plurality of first attracting elements 104. The first attracting elements 104 are adjacently disposed on the sliding element 102. The sliding element 102 is slidably disposed in the slot 100c of the accommodating seat 100. The sliding element 102 includes two locating pins 102a. The accommodating seat 100 includes four guiding grooves 100d at the inner wall of the slot 100c. Each of the first casing 100a and the second casing 100b includes two guiding grooves 100d, and the two guiding grooves 100d at the first casing 100a aligns to the two guiding grooves 100d at the second casing 100, Each of the locating pins 102a of the sliding element 102 is locked between the corresponding guiding groove 100d at the first casing 100a and the corresponding guiding groove 100d at the second casing 100b, Each of the guiding grooves 100d is in parallel with the plugging direction D of the slot 100c. Thus, when the hearing sheet 140 is inserted to the slot 100c of the accommodating seat 100 and the tablet module 10 is combined with the docking base 14, the bearing sheet 140 abuts against the sliding element 102 in the accommodating seat 100 and pushes it to make the sliding element 102 slide towards the bottom of the slot 100c along the plugging direction D (as shown in FIG. 2A to FIG. 2B).

Figure 5A:
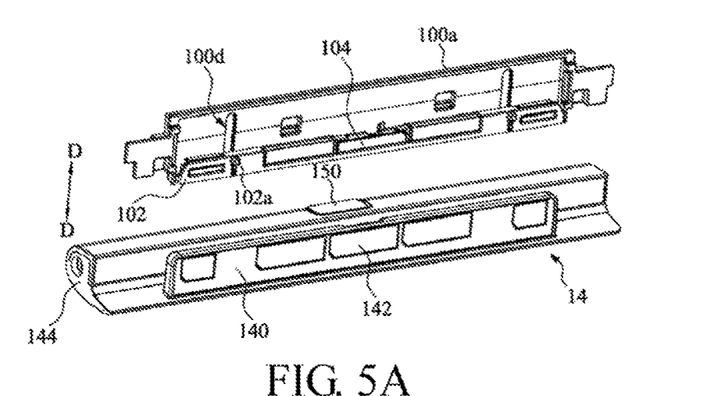
FIG. 5A is a schematic diagram showing the accommodating seat without the second casing and the docking base in FIG. 2A.
Figure 5B:
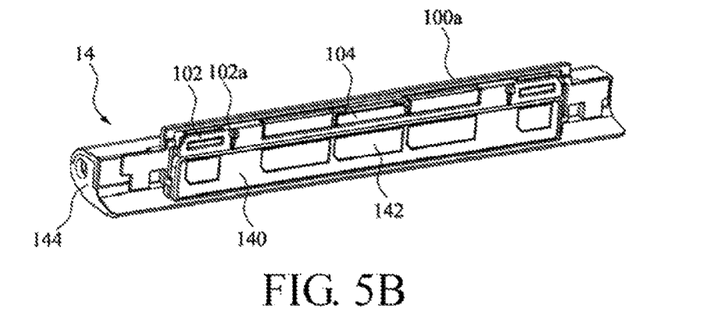
FIG. 5B is a schematic diagram showing, the accommodating, seat without the second casing and the docking base in FIG. 2B.
Figure 6:
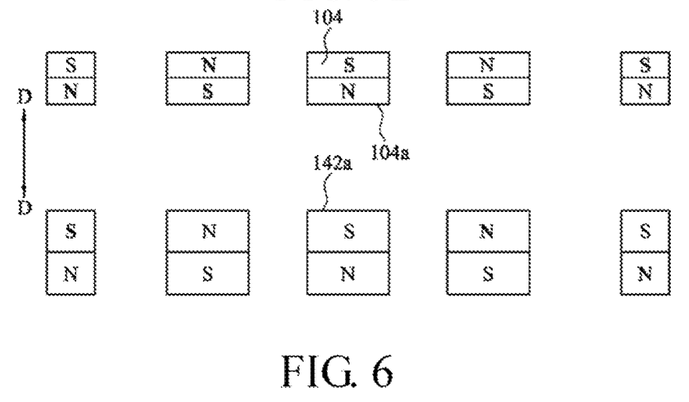
FIG. 6 is a front view showing first attracting elements and second attracting elements in FIG. 5A.

Please refer to FIG. 5A, FIG. 5B and FIG. 6, FIG. 5A is a schematic diagram showing the accommodating seat without the second casing 100b and the docking base in FIG. 2A. FIG. 5B is a schematic diagram showing the accommodating seat without the second casing 100b and the docking base in FIG. 2B. FIG. 6 is a front view showing the first attracting elements and second attracting elements 142 in FIG. 5A.

Please refer to FIG. 5A to FIG. 6, in the embodiment, the first attracting elements 104 are disposed adjacent to each other at the sliding element 102 and are arranged in a straight line. The first attracting elements 104 have a first attracting side 104a (which is the bottom of the first attracting elements 104 in FIG. 6). Furthermore, the docking base 14 also includes a plurality of second attracting elements 142. The second attracting elements 142 are disposed adjacent to each other at the bearing sheet 140 and are arranged in a straight line. When the bearing sheet 140 is inserted into the slot 100c of the accommodating seat 100 (as shown in FIG. 5B), the first attracting elements 104 are arranged parallel with the second attracting elements 142. The second attracting elements 142 include a second attracting side 142a (which is the top side of the second attracting elements 142 in FIG. 6), in other words, when the bearing sheet 140 of the docking base 14 is inserted to the slot 100c of the accommodating seat 100, the first attracting side 104a of the first attracting elements 104 faces the second attracting side 142a of the second attracting elements 142.

As shown in FIG. 6, in the embodiment, the polarities of each two adjacent first attracting elements 104 at the first attracting side 104a are different, and the polarities of each two adjacent second attracting elements 142 at the second attracting side 142a are different. The polarity of each of the first attracting elements 104 at the first attracting side 104a is different from the polarity of the corresponding second attracting element 142 at the second attracting side 142a, and the first attracting side 104a is attracted with the second attracting side 142a. For example, if the polarity of the first attracting elements 104 at the first attracting side 104a is N-pole, the polarity of the corresponding second attracting elements 142 at the second attracting side 142a is S-pole, which is shown as the first attracting element 104 and the second attracting element 142 in the center in FIG. 6. However, the polarities of the first attracting elements 104 and the second attracting elements 142 are not limited to the embodiment in FIG. 6.

Thus, the polarity of each of the first attracting elements 104 at the first attracting side 104a is the same and repulsive with the polarity of the second attracting elements 142 which are beside the corresponding second attracting element at the second attracting side 142a, and the polarity of each of the second attracting elements 142 at the second attracting side 142a is the same and repulsive with the polarity of the first attracting elements 104 which are beside the corresponding first attracting element 104 at the first attracting side 104a, so each of the first attracting elements 104 is guided to align to the corresponding second attracting' element 142. That means, when the first attracting side 104a of the first attracting elements 104 approaches the second attracting side 142a of the second attracting elements 142, the magnetic attracting force of any group of the first attracting elements 104 and the corresponding second attracting elements 142 makes the sliding element 102 approach the bearing sheet 140. The first attracting elements 104 beside one first attracting element 104 generate a repulsive force to the corresponding second attracting, element 142, and the second attracting elements 142 beside the corresponding second attracting element 142 generate a repulsive force to the first attracting, element 104, and thus the relative position between the sliding element 102 and the bearing sheet 140 is corrected automatically. Consequently, when the tablet module 10 approaches the docking base 14, the first attracting elements 104 at the sliding, element 102 and the second attracting elements 142 at the bearing sheet 140 can make the tablet module 10 align and connect to the docking base 14 conveniently and precisely.

In order to achieve the function of correcting the relative position between the sliding element 102 and the bearing sheet 140 automatically, in the embodiment, the number of the first attracting elements 104 and the number of the second attracting elements 142 are the same and are odd, but the number of the first attracting elements 104 and the second attracting elements 142 is not limited to that in the figures and can be adjusted according to practical requirements.

Figure 7:
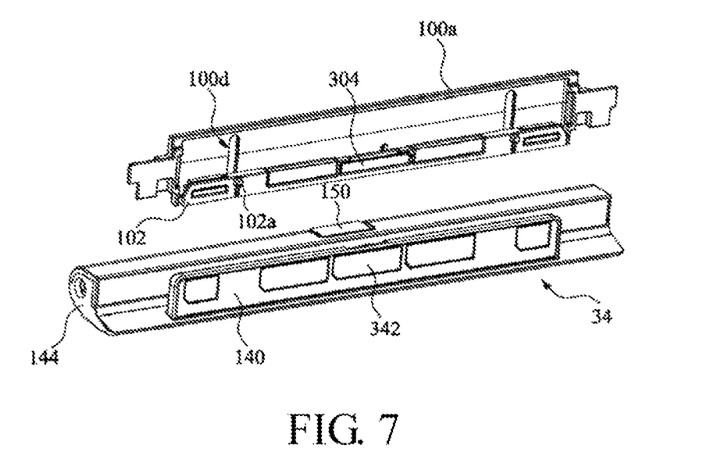
FIG. 7 is an exploded diagram showing a part of components in an accommodating seat and a docking base in another embodiment.
Figure 8:
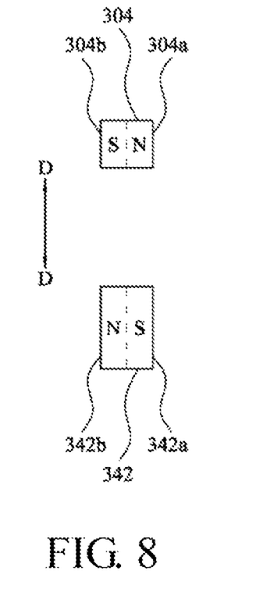
FIG. 8 is a side view showing one group of first attracting elements and second attracting elements in FIG. 7.

Please refer to FIG 7 and FIG. 8. FIG 7 is an exploded diagram showing a part of components in the accommodating seat 100 and the docking base 34 in another embodiment. FIG. 8 is a side view showing one group of the first attracting elements 304 and the second attracting elements 342 in FIG. 7.

As shown in FIG. 7 and FIG. 8, in the embodiment, the first attracting elements 304 are adjacently disposed on the sliding; element 102 and are arranged in a straight line. The first attracting elements 304 have a first attracting side 304a and a third attracting side 304b (as shown in FIG. 8). The docking base 34 further includes a plurality of second attracting elements 342. The second attracting elements 342 are adjacently disposed on the bearing sheet 140 and are arranged in a straight line. When the bearing sheet 140 is inserted to the slot 100c of the accommodating seat 100, the first attracting elements 304 are arranged parallel with the second attracting elements 342. The second attracting elements 342 have a second attracting side 342a and a fourth attracting side 342b (as shown in FIG. 8). In other words, when the bearing sheet 140 of the docking base 34 is inserted to the slot 100c of the accommodating seat 100, the first attracting side 304a of the first attracting elements 304 is in parallel with the second attracting side 342a of the second attracting elements 342, and the third attracting side 304b of the first attracting elements 304 is in parallel with the fourth attracting side 342b of the second attracting elements 342.

As shown in FIG. 8, in the embodiment, the polarities of each two adjacent first attracting elements 304 at the first attracting side 304a and the third attracting side 304b are different. The polarities of each two adjacent second attracting elements 342 at the second attracting side 342a and the fourth attracting side 342b are different. The polarity of each of the first attracting elements 304 at the first attracting side 304a is different from the polarity of the corresponding second attracting element 342 at the second attracting side 342a, and the polarity of each of the first attracting elements 304 at the third attracting side 304h is different from the polarity of the corresponding second attracting element 342 at the fourth attracting side 342b. Thus, the first attracting side 304a is attracted with the second attracting side 342a, and the third attracting side 304b is attracted with the fourth attracting side 342b.

For example, if the polarities of the first attracting, elements 304 at the first attracting side 304a and the third attracting side 304b are N-pole and S-pole, respectively, the polarities of the corresponding second attracting elements 342 at the second attracting side 342a and the fourth attracting side 342b are S-pole and N-pole, respectively, as shown in FIG. 8. However, the polarities of the first attracting elements 304 and the second attracting elements 342 are not limited to the embodiment shown in FIG. 8.

Consequently, the polarities of each of the first attracting elements 304 at the first attracting side 304a and the third attracting side 304b are the same and repulsive with the polarities of the second attracting elements 342 which are beside the corresponding second attracting element 342 at the second attracting, side 342a and the fourth attracting side 342b, and the polarities of each of the second attracting elements 342 at the second attracting side 342a and the fourth attracting side 342b are the same and repulsive with the polarities of the first attracting elements 304 which are beside the corresponding first attracting element 304 at the first attracting side 304a and the third attracting side 304b, so each of the first attracting elements 304 is guided to align to the corresponding second attracting element 342.

That means, for any group of the first attracting element 304 and the corresponding second attracting element 342, the attracting force between the first attracting side 304a and the second attracting side 342a and the attracting force between the third attracting side 304b and the fourth attracting side 342b would make the sliding element 102 and the bearing sheet 140 approach to each other. The first attracting elements 304 which are beside and adjacent to the first attracting element 304 generate a repulsive force to the corresponding second attracting element 342, and the second attracting elements 342 which are beside and adjacent to the second attracting element 342 also generate a repulsive force to the corresponding first attracting elements 304, and thus the relative position between the sliding element 102 and the bearing sheet 140 is corrected automatically Consequently, when the user holds the tablet module 10 close to the docking base 34, the first attracting elements 304 at the sliding element 102 and the second attracting elements 342 at the bearing Sheet 140 can make the tablet module 10 align and connect to the docking base 34 conveniently and precisely.

In order to achieve the function of correcting the relative position between the sliding element 102 and the bearing sheet 140 automatically, in the embodiment, the number of the first attracting elements 304 and the number of the second attracting elements 342 are the same and are odd, but the number of the first attracting elements 304 and the second attracting elements 342 is not limited to that in the figures and can be adjusted according to practical requirements.

Figure 9A:
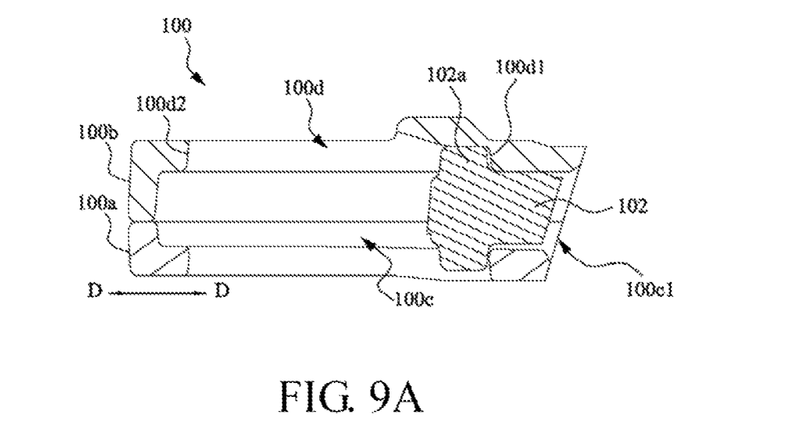
FIG. 9A is a sectional schematic diagram showing the accommodating seat in FIG. 2A along a line 9A-9A'.

FIG. 9A is a sectional schematic diagram showing the accommodating seat 100 in FIG. 2A along a line 9A-9A'.

As shown in FIG. 2A and FIG. 9A, in the embodiment, the guiding groove 100d of the accommodating seat 100 has a first end 100d1 and a second end 100d2 The first end 100d1 is close to the opening 100c1 of the accommodating seat 100, and the second end 100d2 is dose to the bottom of the slot 100c (which is the inner wall of the slot 100c away from the opening 100c1). When the locating pin 102a of the sliding element 102 is locked at the first end 100d1 of the guiding groove 100d, the sliding element 102 is at the opening 100c1. When the bearing sheet 140 of the docking base 14 is inserted to the slot 100c of the accommodating seat 100, the bearing sheet 140 pushes the sliding element 102 to the bottom of the slot 100c, and makes the locating pin 102a of the sliding element 102 locked at the second end 100d2 of the guiding groove 100d.

Figure 9B:
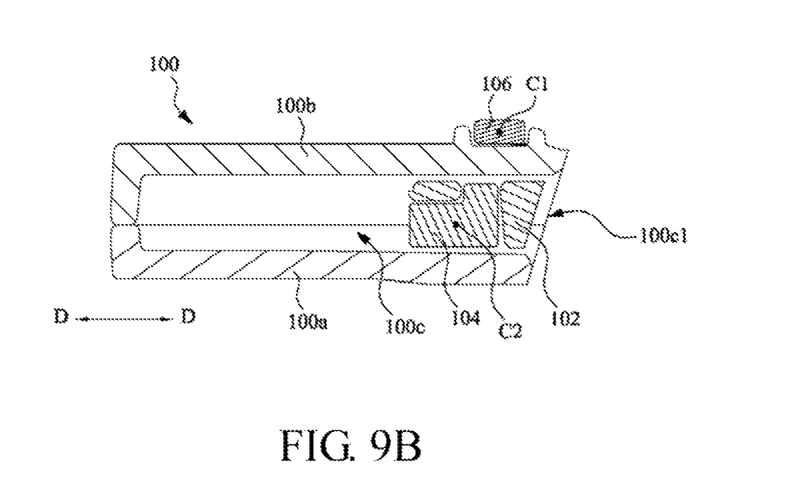
FIG. 9B is a sectional schematic diagram showing the accommodating seat in FIG. 2A along a line 9B-9B'.

FIG. 9B is a sectional schematic diagram showing the accommodating seat 100 in FIG. 2A along a line 9B-9B'.

As shown in FIG. 2A and FIG. 9B, in the embodiment, the tablet module 10 further includes two third attracting elements 106. The third attracting elements 106 are disposed at the outer wall of the accommodating seat 100 and are close to the opening 100c1. The third attracting elements 106 are used to attract one of the first attracting elements 104 to make the sliding element 102 stay at the opening 100c1 of the accommodating seat 100.

Furthermore, the length of the third attracting element 106 along the plugging direction D equals to or is smaller than that of the corresponding first attracting, element 104 at the plugging direction D. The third attracting, element 106 has a first length center C1 at the plugging direction D, the corresponding first attracting element 104 has a second length center C2 at the plugging direction D, and the first length center C1 is between the opening 100c1 of the accommodating seat 100 and the second length center C2 at the plugging direction D.

In other words, compared with the second length center C2 of the corresponding first attracting element 104, the first length center C1 of the third attracting element 106 is closer to the opening 100c1 of the accommodating seat 100 at the plugging direction D, and thus the attracting force between the third attracting element 106 and the corresponding first attracting element 104 can keep the locating pin 102a of the sliding element 102 locked at the first end 100d1 of the guiding groove 100d as shown in FIG. 9A).

Figure 10:
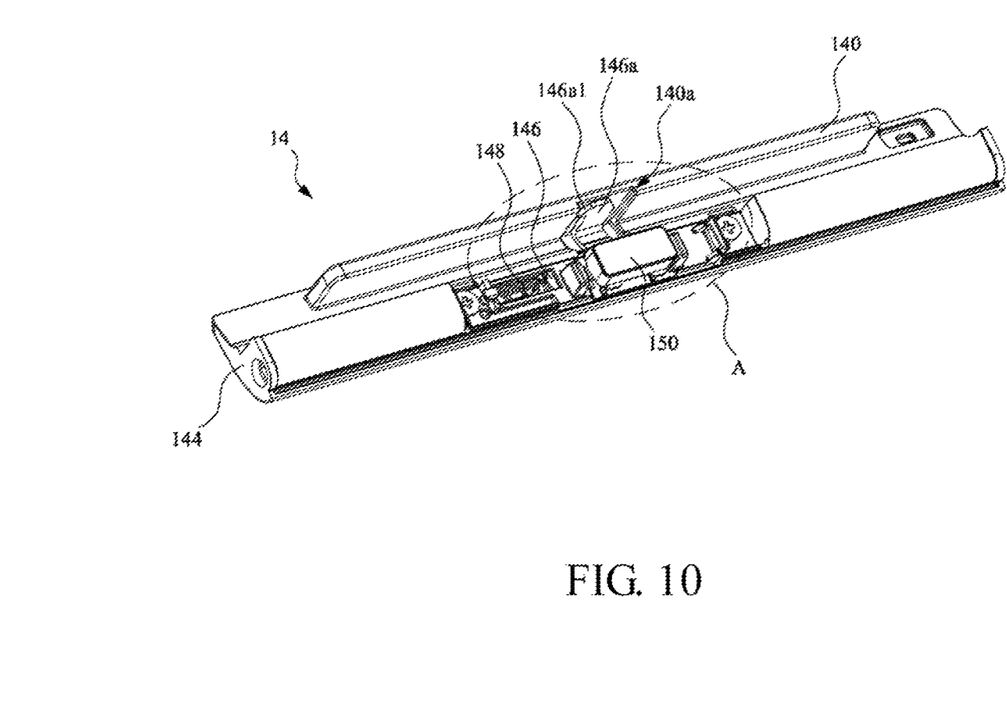
FIG. 10 is a schematic diagram showing a part of components in the docking base in FIG. 2A.
Figure 11A:
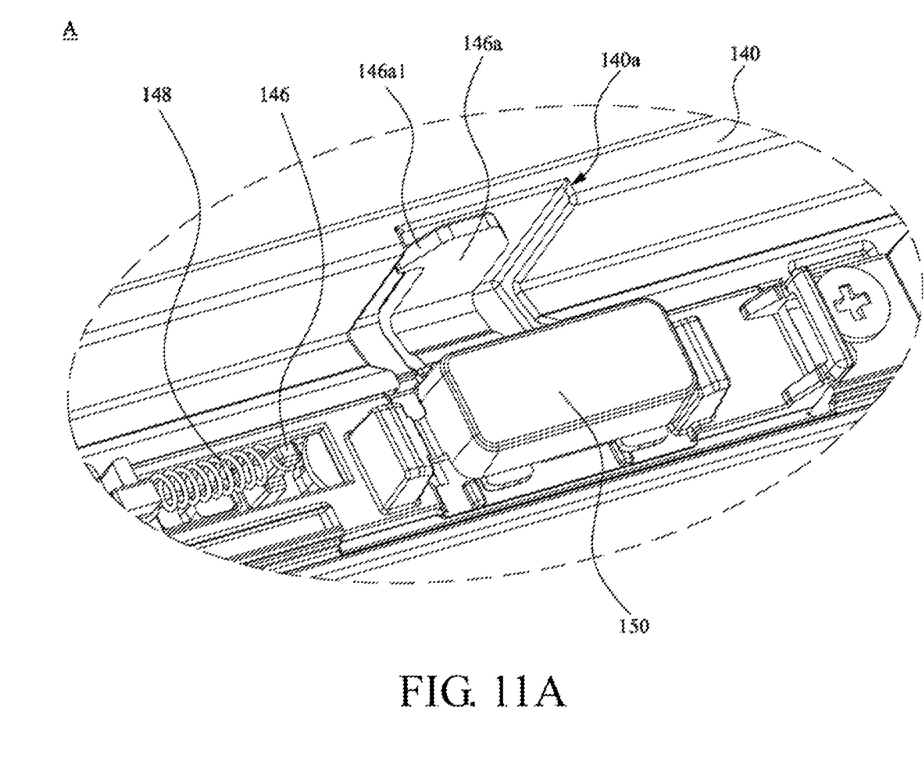
FIG. 11A is a partial enlarged diagram showing the components in FIG. 10.
Figure 11B:
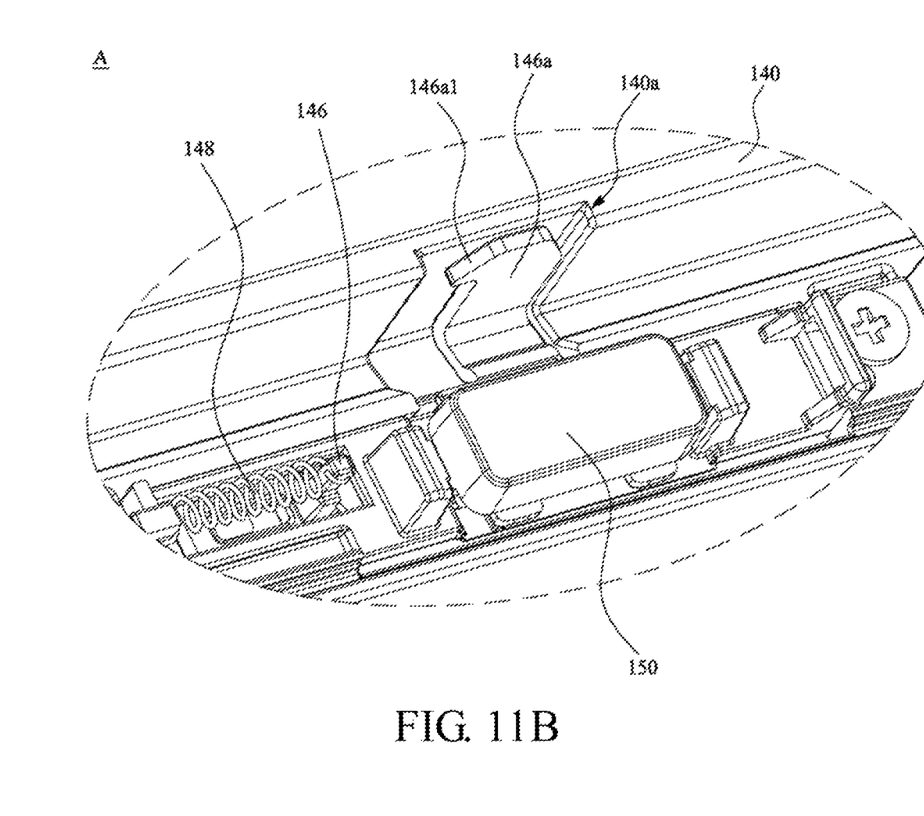
FIG. 11B is another partial enlarged diagram showing that a release button of the components in FIG. 10 is pressed.

Please refer to FIG. 10, FIG. 11A and FIG. 11B. FIG. 10 is a schematic diagram showing a part of components in the docking base 14 in FIG. 2A. FIG. 11A is a partial enlarged diagram showing the components in FIG 10. FIG. 11B is another partial enlarged diagram showing that a release button 150 of the components in FIG. 10 is pressed.

As shown in FIG. 3 and FIG. 4, in the embodiment, the accommodating seat 100 includes an engagement rib 100e. The engagement rib 100e is in the slot 100c and includes an abutting end 100e1 and an engagement end 100e2. The abutting end 100e1 of the engagement rib 100e is close to the opening 100c1 of the accommodating seat 100, and the engagement end 100e2 of the engagement rib 100e is close to the bottom of the slot 100c. As shown in FIG. 10 to FIG. 118, the docking base 14 further includes a body 144, a latch hook element 146, a resetting element 148 and a release button 150. The hearing sheet 140 of the docking base 14 is connected to the body 144 and includes a recessed groove 140a. The latch hook element 146 of the docking base 14 is slidably disposed at the body 144 and includes a hook 146a. The hook 146a of the latch hook element 146 is accommodated in the recessed groove 140a of the bearing sheet 140. The hook 146a has an inclined plane 146a1 When the hearing sheet 140 is inserted to the slot 100c of the accommodating seat 100, the abutting end 100e1 of the engagement rib 100e abuts against the inclined plane 146a1 to make the hook 146a slide away (as shown in FIG. 11A to FIG. 11B) along the engagement rib 100e. The resetting element 148 of the docking base 14 is disposed at the body 144. When the hook 146a slides to the engagement end 100e2 along the engagement rib 100e, the resetting element 148 makes the hook 146a reset (as shown in FIG. 11B to FIG. 11A) and locked to the engagement end 100e2. Thus, the bearing sheet 140 of the docking, base 14 can be locked and fixed to the accommodating seat 100, so as to combine the tablet module 10 and the docking base 14. In the embodiment, the resetting element 148 is a stretchable spring, which is not limited herein.

Moreover, the release button 150 of the docking base 14 is operably connected to the body 144, and it can slide towards or away from the body 144. When the release button 150 is pressed towards the body 144, the release button 150 pushes the latch hook element 146 to make the latch hook element 146 slide relative to the body 144 (as shown in FIG. 11A to FIG. 11B), and the hook 146a is unlocked from the engagement rib 100e. Thus, the bearing sheet 140 of the docking base 14 is detached from the accommodating seat, 100, and the tablet, module 10 is detached from the docking base 14.

As stated above, in the electronic device, the polarities of each two first attracting elements of the tablet module at the first attracting side are different, the polarities of each two second attracting elements of the bearing sheet at the second attracting side are also different, and the polarity of each first attracting element at the first attracting side is different from the polarity of the corresponding second attracting element at the second attracting side. Thus, for any group of the first attracting element and the corresponding second attracting element, when the first attracting side approaches the second attracting side, the attracting force therebetween would make the tablet module and the bearing sheet approach to each other. The first attracting elements beside one first attracting, element generate a repulsive force to the corresponding second attracting element, and the second attracting elements beside the corresponding second attracting element 142 also generate a repulsive force to the first attracting element 104, so as to automatically correct a relative position between the tablet module and the bearing sheet, and make the tablet module align and connect to the docking base conveniently.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An electronic device, comprising:
   a tablet module including a slot, wherein the tablet module includes:
      a sliding element slidably disposed in the slot; and
      a plurality of first attracting elements adjacently disposed on the sliding element and including a first attracting side, wherein polarities of each two adjacent first attracting elements at the first attracting side are different; and
   a docking base including:
      a bearing sheet inserted to the slot and abutting against the sliding element; and
      a plurality of second attracting elements adjacently disposed on the bearing sheet and including a second attracting side, wherein polarities of each two adjacent second attracting elements at the second attracting side are different,
   wherein the polarity of each of the first attracting elements at the first attracting side is different from the polarity of the corresponding second attracting element at the second attracting side, and the first attracting side is attracted with the second attracting side,
   the polarity of each of the first attracting elements at the first attracting side is the same and repulsive with the polarity of the second attracting elements which are beside the corresponding second attracting element at the second attracting side, the polarity of each of the second attracting elements at the second attracting side is the same and repulsive with the polarity of the first attracting elements which are beside the corresponding first attracting element at the first attracting side, and each of the first attracting elements is guided to align to the corresponding second attracting element.

2. The electronic device according to claim wherein the number of the first attracting elements is the same as the number of the second attracting elements, and the number is odd.

3. The electronic device according to claim 1, wherein when the bearing sheet is inserted to the slot, the first attracting side faces the second attracting side.

4. The electronic device according to claim 3 wherein the bearing sheet is inserted to the slot along a plugging direction, and the plugging direction is vertical to a surface at the first attracting side of the first attracting, elements and a surface at the second attracting side of the second attracting elements.

5. The electronic device according to claim 1, wherein the first attracting elements further include a third attracting side, the polarities of each two adjacent first attracting elements at the third attracting side are different, the first attracting side and the third attracting side are at two sides of the first attracting elements respectively, the second attracting elements further include a fourth attracting side, the polarities of each two adjacent second attracting elements at the fourth attracting side are different, the second attracting, side and the fourth attracting side are at two sides of the second attracting elements respectively, the polarity of each of the first attracting elements at the third attracting side is different from the polarity of the corresponding second attracting element at the fourth attracting side, the third attracting side is attracted with the fourth attracting side, the polarity of each of the first attracting elements at the third attracting side is the same and repulsive with the polarity of the second attracting, elements which are beside the corresponding second attracting element at the fourth attracting side, the polarity of the second attracting elements at the fourth attracting side is the same and repulsive with the polarity of the first attracting elements which are beside the corresponding first attracting element at the third attracting side, and each of the first attracting elements is guided to align to the corresponding second attracting element.

6. The electronic device according to claim 5, wherein when the bearing sheet is inserted to the slot., the first attracting side and the second attracting side are parallel and side by side, and the third attracting side and the fourth attracting side are parallel and side by side.

7. The electronic, device according to claim 6, wherein the bearing sheet is inserted to the slot along a plugging direction, and t he plugging direction is in parallel with surfaces at the first attracting side and the third attracting side of the first attracting elements, and the plugging direction is in parallel with surfaces at the second attracting side and the fourth attracting side of the second attracting elements.

8. The electronic device according to claim 1, wherein the sliding element includes at least one locating pin, the tablet module further includes an accommodating seat, the slot is formed in the accommodating seat, at least one guiding groove is formed at an inner wall of the slot in the accommodating seat, and the guiding groove locks the locating pin and is in parallel with a plugging direction along, which the bearing sheet is inserted to the slot.

9. The electronic device according to claim 8, wherein the slot includes an opening, the guiding groove includes a first end and a second end, the first end is beside the opening, and when the locating pin is locked at the first end, the sliding element is at the opening.

10. The electronic device according to claim 9, wherein the tablet module further includes at least one third attracting element, the third attracting element is disposed at an outer wall of the accommodating seat and is beside the opening, and the third attracting, element is used to attract one of the first attracting, elements to make the sliding element stay in the opening.

11. The electronic device according to claim 10, wherein the length of the third attracting element at the plugging direction equals to or is smaller than the length of the corresponding first attracting element at the plugging direction, the third attracting element has a first length center at the plugging direction, the corresponding first attracting element has a second length center at the plugging direction, and the first length center is between the opening and the second length center at the plugging direction.

12. The electronic device according to claim 9, wherein the accommodating seat includes an engagement rib, the engagement rib is disposed in the slot and includes an abutting end and an engagement end, the abutting end is beside the opening, the bearing sheet includes a recessed groove, and the docking base further includes:
    a body, wherein the bearing sheet is connected to the body;
    a latch hook element slidably disposed at the body and including a hook, wherein the hook is accommodated in the recessed groove, the hook includes an inclined plane, and when the bearing sheet is inserted to the slot, the abutting end abuts against the inclined plane to make the hook move away and slide along the engagement rib; and
    a resetting element disposed at the body, wherein when the hook slides to the engagement end along the engagement rib, the resetting element makes the hook reset and locked to the engagement end.

13. The electronic device according to claim 12, wherein the docking base further includes a release button, the release button is operably connected to the body and moves towards or away from the body, when the release button is pressed towards the body, the release button pushes the latch hook element to make the latch hook element slide relative to the body and make the hook separate from the engagement rib.

* * * * *